United States Patent

Karras et al.

[15] 3,663,756

[45] May 16, 1972

[54] DIALED NUMBER PRINTOUT SYSTEM

[72] Inventors: Ernest C. Karras, Chicago; Lester R. Cain, Oaklawn, both of Ill.

[73] Assignee: Comtech Corporation, Broadview, Ill.

[22] Filed: Oct. 27, 1969

[21] Appl. No.: 869,455

[52] U.S. Cl. ....................................................... 179/7.1 TP

[51] Int. Cl. ....................................................... H04m 15/18

[58] Field of Search ........179/18 EB, 7.1 TP, 90 AN, 175.24, 179/175.2 C

[56] References Cited

UNITED STATES PATENTS

| | | | |
|---|---|---|---|
| 1,640,085 | 8/1927 | Madsen | 179/175.2 C |
| 3,007,015 | 10/1961 | White | 179/90 AN X |
| 3,185,770 | 5/1965 | Lombard | 179/7.1 TP |

*Primary Examiner*—Ralph D. Blakeslee
*Attorney*—Mason, Kolehmainen, Rathburn & Wyss

[57] ABSTRACT

A small, portable, dialed number printout unit is provided which can be used in central offices or at the subscriber's premises to provide a print of the called number in numerical form on a record medium as soon as this number is dialed by the calling party. Printout of the called number will automatically occur approximately 20 seconds after the last digit is dialed or upon hang-up, whichever is sooner. Facilities are also provided for selectively printing only those dialed numbers which have a predetermined number of digits and rejecting all dialed numbers having digits greater or less than said predetermined number. A false digit appearing on the line before dialing is started may be automatically absorbed and not printed. Facilities are also provided for automatically advancing the record medium a predetermined amount after each printing operation such that the printed called number is immediately visible to an attendant.

5 Claims, 7 Drawing Figures

TYPICAL DIALED NUMBER PRINTOUT SYSTEM

TYPICAL DIALED NUMBER PRINTOUT SYSTEM

INVENTORS:
LESTER R. CAIN
ERNEST C. KARRAS
BY Mason, Kolehmainen Rathburn & Wyss
ATTORNEYS

SERVICE OBSERVATION UNIT - 20

Patented May 16, 1972 3,663,756

4 Sheets-Sheet 3

DIALED NUMBER PRINTOUT SYSTEM

The present invention relates to a dialed number printout system for use in conjunction with telephone equipment, and, more particularly, to a dialed number printout system which is effective to print the number of the called line immediately after this number has been dialed by the calling party.

Various arrangements have heretofore been proposed for providing a permanent record of the called number which is dialed by the calling party. In general, these arrangements have been a part of central office toll ticketing equipment wherein both the calling and called party numbers are recorded together with the time duration of the call and from which information toll charges and other data are derived. Traffic recording equipment has also heretofore been employed in conjunction with central office telephone equipment to study traffic conditions in a particular office, but such equipment has generally been limited to providing a count of the total number of calls made, the time required to answer a particular call, and other similar information.

While such toll ticketing equipment and traffic recording equipment is generally suitable for its intended purpose, it is not sufficiently adaptable, flexible or portable to be useful in many special situations. For example, in many instances selective recognition of calls having a certain number of digits is necessary or desirable. Thus, it may be desirable to separate out all toll calls made from a particular office without printing all local calls, or vice versa. It may also be desirable in certain instances to provide a printed record of the times when special services, involving only three dialed digits, are used. Again, there may be situations where it is necessary or desirable to trace only those calls which are abusing the operator privileges by continually dialing the single digit "0."

Prior traffic analysis or printout equipment has also suffered from the disadvantage that it is not available to a subscriber for use on his premises in determining actual traffic conditions on said premises. If, for example, a subscriber is renting a WATS line on a wide band basis, it would be desirable for the subscriber to be able to determine on his premises the destination of the calls which are made over this WATS line. If he finds, for example, that most calls are going to a particular area requiring a smaller band, he may save himself a considerable amount of money by leasing only the smaller band. Furthermore, by having a permanent record of the calls which have been made, a check can be made to see whether they are predominantly business or personal calls. Also, such record can also be used to verify toll ticketing equipment records in the central office.

A further instance where it is desirable to provide dialed number printout facilities at the subscriber's premises is in those situations where internal security is required with respect to a particular plant or office. Under such conditions it is desirable to check the outgoing calls on an outgoing line, or lines. The provision of dialed number printout facilities from which the dialed number is quickly available together with continuous surveillance of the line, or lines, is particularly important in maintaining such security. Furthermore, if line lockout facilities are provided in conjunction with such dialed number printout equipment, the line making the unauthorized call may be locked up and the call may be traced to its originating point.

It is, therefore, an object of the present invention to provide a new and improved dialed number printout system in which one or more of the above-discussed disadvantages of prior art arrangements are avoided.

It is another object of the present invention to provide a new and improved dialed number printout system which provides a permanent record in printed form of the dialed number as soon as dialing is completed by the calling party.

It is a further object of the present invention to provide a new and improved dialed number printout system which is portable and of small size and may be connected to either dial office or PBX lines and trunks to provide continuously a permanent printout of dialed numbers.

It is a still further object of the present invention to provide a dialed number printout system which will selectively recognize and print only dialed numbers having a predetermined number of digits.

It is another object of the present invention to provide a dialed number printout system wherein the number of digits in the calls which are printed out may be so selected to provide different types of traffic analyses.

It is a further object of the present invention to provide a dialed number printout system which provides a selective printout of a predetermined type of call only.

It is a still further object of the present invention to provide a dialed number printout system which prints out only called numbers having a predetermined number of digits and rejects calls having digits above and below said predetermined number.

It is another object of the present invention to provide a portable dialed number printout system which is capable of automatically monitoring WATS line and DDD calls at the subscriber's premises.

It is another object of the present invention to provide a new and improved dialed number printout system which can selectively print out a record of either outgoing or incoming traffic on toll trunks.

It is a further object of the present invention to provide a new and improved dialed number printout system which cooperates with service observation equipment to permit the tracing of abusive calls.

It is another object of the present invention to provide a dialed number printout and line surveillance system in which any one line in a group of lines may be placed under continuous surveillance and when the line is seized and a call initiated an alarm is given and the called number is available in printed record form.

It is another object of the present invention to provide a portable internal security unit which is capable of monitoring a particular line, printing out the called number as soon as it is dialed by the calling party, and locking up the calling line so that the call may be traced even though the calling party hangs up.

In accordance with the present invention, the dialed number printout system comprises a small portable unit which may be employed either at the dial office or with PBX equipment and is provided with either series or bridging type input connections for connection with different types of input signals. A multi-bank stepping switch is employed in connection with a multi-channel printer of the solenoid-operated ratchet-actuated print wheel type so that a record of any number which is called on the line or trunk connected to the dialed number printout system is substantially immediately available in printed record form. Furthermore, facilities are provided for pre-selection of the number of digits in the number which is printed so that only those calls having the pre-selected number of digits are recorded and calls having smaller and larger numbers of digits than the pre-selected value are not printed.

The invention, both as to its organization and method of operation, together with further objects and advantages thereof, will best be understood by reference to the following specification taken in connection with the accompanying drawings in which.

Figure 6:
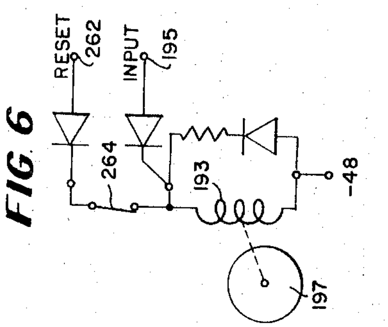
Figures 1, 4:
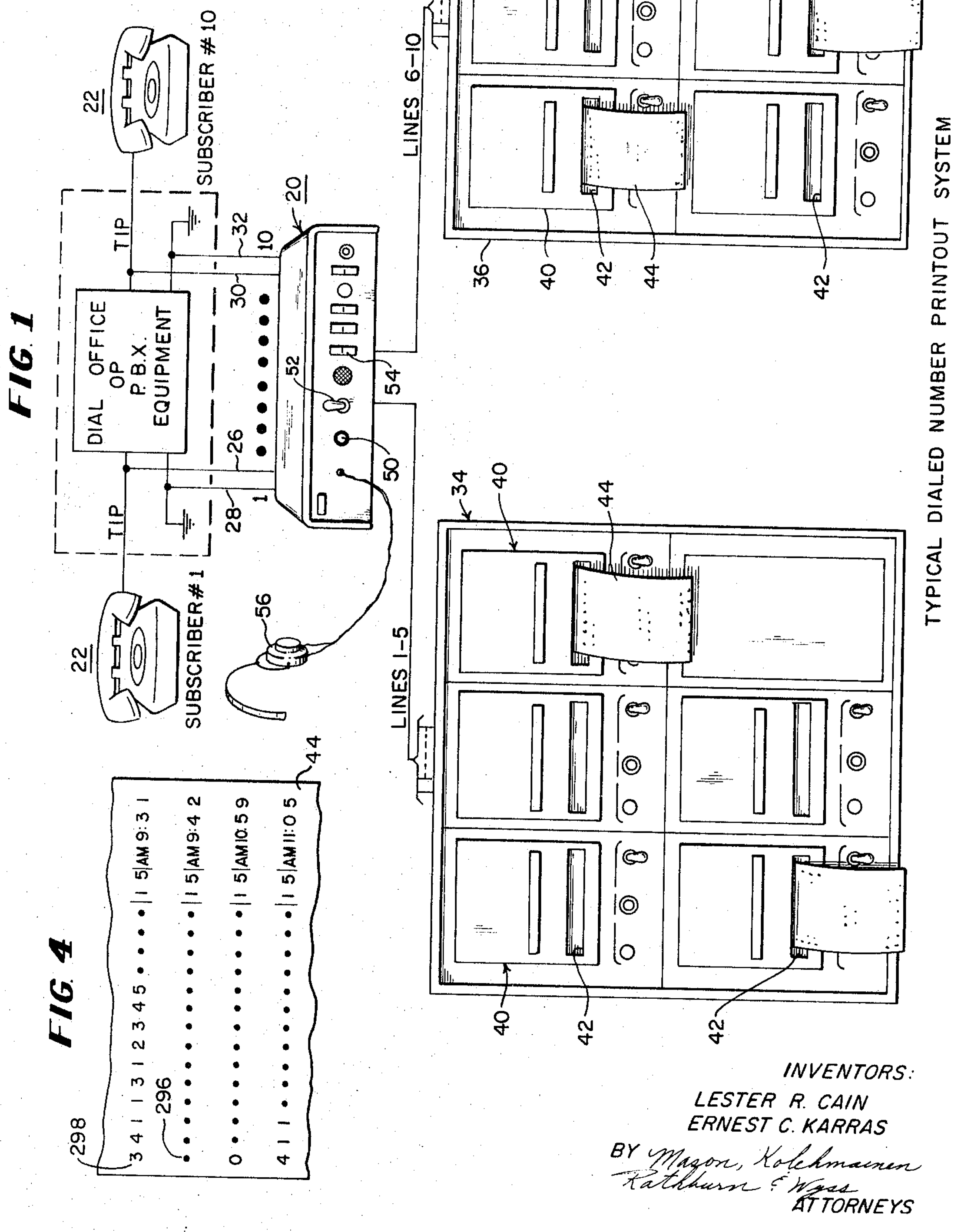
FIG. 1 is a block diagram of a typical dialed number printout system wherein a group of dialed number printout units are employed in connection with a service observation unit capable of servicing 10 lines.
Figure 3A:
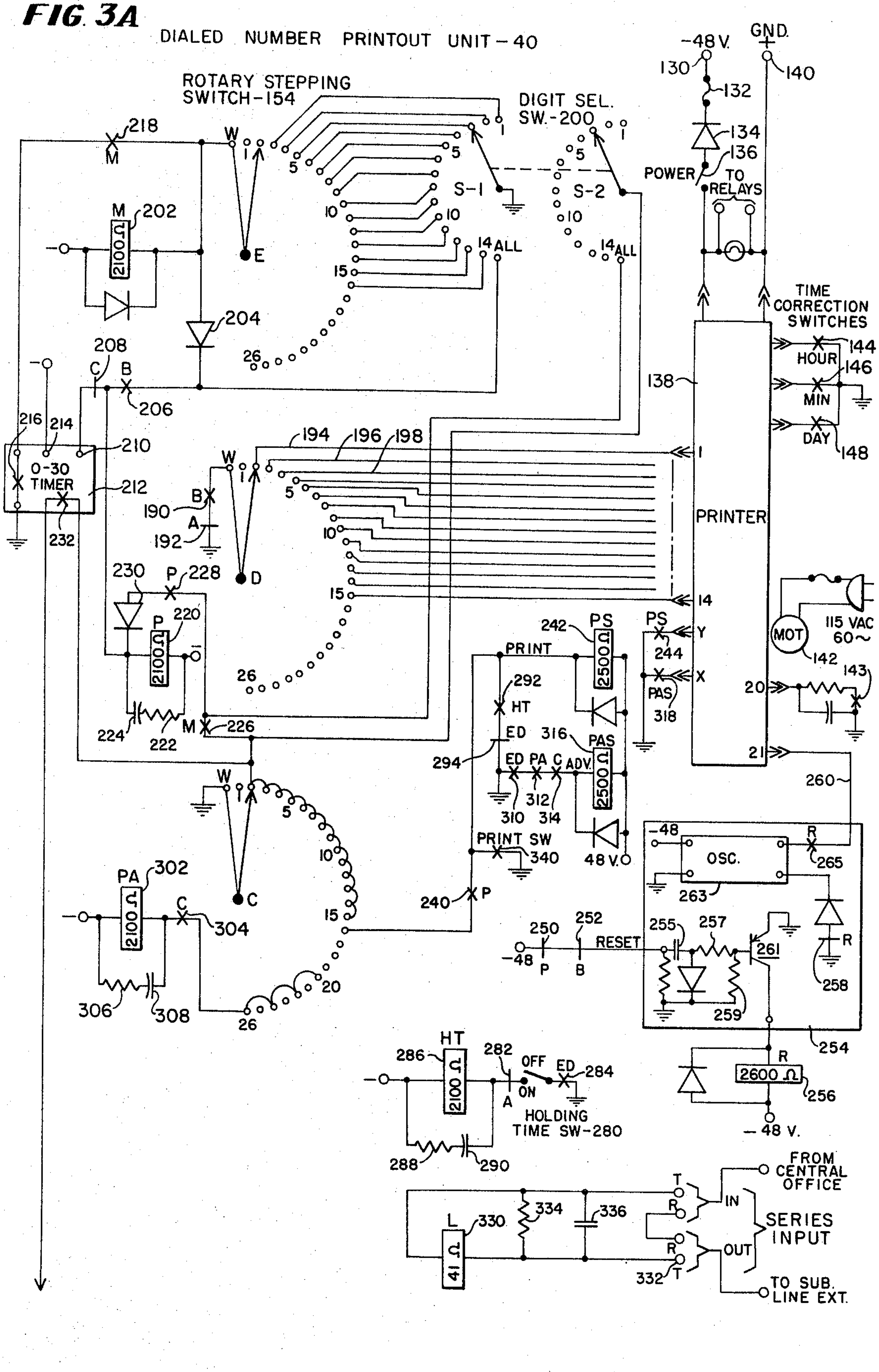
Figure 3B:
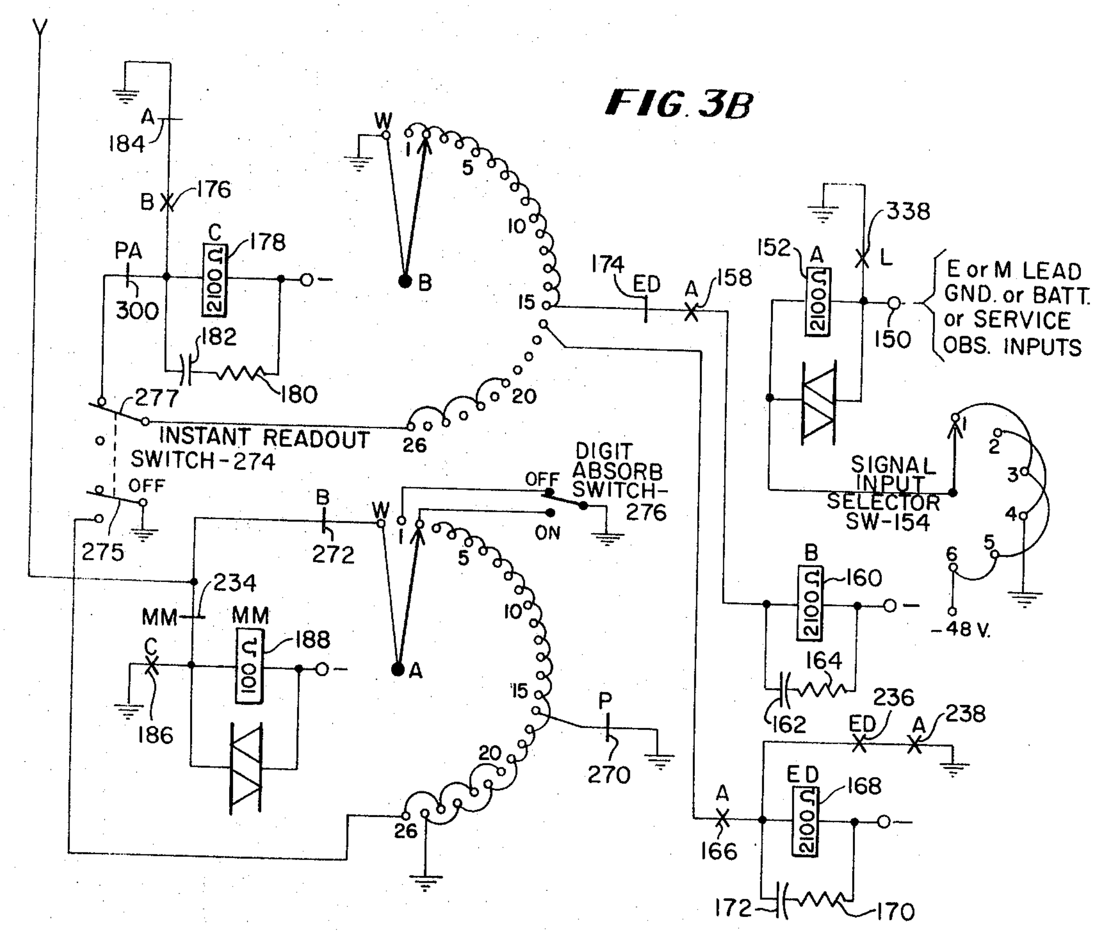
Figure 5:
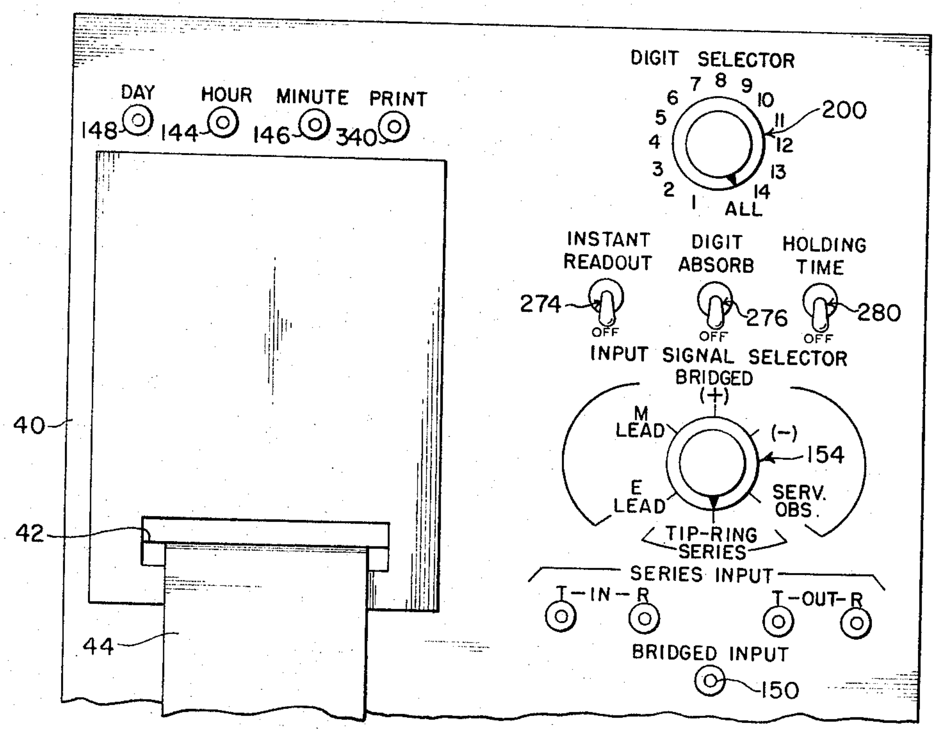

FIGS. 3A and 3B when placed one above the other in the order named, comprise a schematic diagram of one of the dialed number printout units in FIG. 1;

FIG. 4 is an illustration of the printed record provided by the dialed number printout system of the present invention;

FIG. 5 is a fragmentary front view of the panel arrangement for the printout unit of FIGS. 3A and 3B; and FIG. 6 is a schematic diagram of one of the print wheel actuating circuits used in the printout unit of FIGS. 3A and 3B.

Referring now to the overall system of FIG. 1, a service observation unit indicated generally at 20 is herein illustrated as serving 10 subscribers'lines, subscriber No. 1 being illustrated as having a hand set 22 and subscriber No. 10 having a hand set indicated generally at 24. The service observation unit 20 is provided with ten separate information process channels each provided with a high impedance event-detecting input for direct connection across a line or trunk without degrading normal transmission. Thus, the first channel may be connected over the conductors 26 and 28 to the tip and ground connections of subscriber No. 1, such connections being conveniently made by clip connections at the corresponding terminals in the dial office or PBX equipment. In a similar manner the 10th channel is connected by way of the conductors 30 and 32 to the tip and ground connections of subscriber No. 10.

Each of the information process channels of the observation unit 20 is provided with an output control relay which may be employed either to actuate one channel of a 10-channel event recorder (not shown), or, as shown in FIG. 1, this control relay may provide an input signal for one of a series of dialed number printout units 40 arranged in FIG. 1 in two cabinets indicated generally at 34 and 36, signals from the output relays in unit 20 corresponding to lines 1 to 5 being supplied to the cabinet 34 and the output corresponding to lines 6 to 10 being supplied to the cabinet 36. A series of five dialed number printout units indicated generally at 40 is contained within each of the cabinets 34, 36, and each of the dialed number printout units is arranged to provide a permanent record of the type shown in FIG. 4, the printer portion of each of these units being provided with a window 42 through which the paper tape record 44 issues with the called number printed thereon substantially immediately following dialing of the called number by the calling party.

The service observation unit 20 is also provided with audio surveillance and line lock facilities which may be employed in cooperation with the printed record 44 of a particular one of the dialed number printout units 40 to permit a particular call to be traced, as required for internal security or other purposes. More particularly, the unit 20 is provided with a line selector switch 50 and a line lock toggle switch 52 also available from the front panel of the unit 20. A particular one of the lines serviced by the unit 20 may be placed under audio surveillance by adjustment of the line selector switch 50 and when an alarm switch 54 is closed an audible alarm will sound when a call is commenced on the line selected by the switch 50. The attendant may then survey the outgoing call by means of the head set 56 and as soon as dialing is completed by the calling party, a printed record is available on the tape 44 of the number which has been called. If this number is suspect, the line lock switch 52 may be thrown to the line lock position which grounds the sleeve lead of the calling subscriber and prevents the connection from being destroyed when the calling party hangs up. The call may then be traced back to the originating point by any suitable method, as will be readily understood by those skilled in the art.

The service observation unit 20 is also provided with a single dialed number printout unit output terminal so that one printout unit may be selectively employed with any one of the 10 lines serviced by the unit 20 in the event that a printed record is desired of only the particular calls which are placed under surveillance by means of the line selector switch 50.

Figure 2:
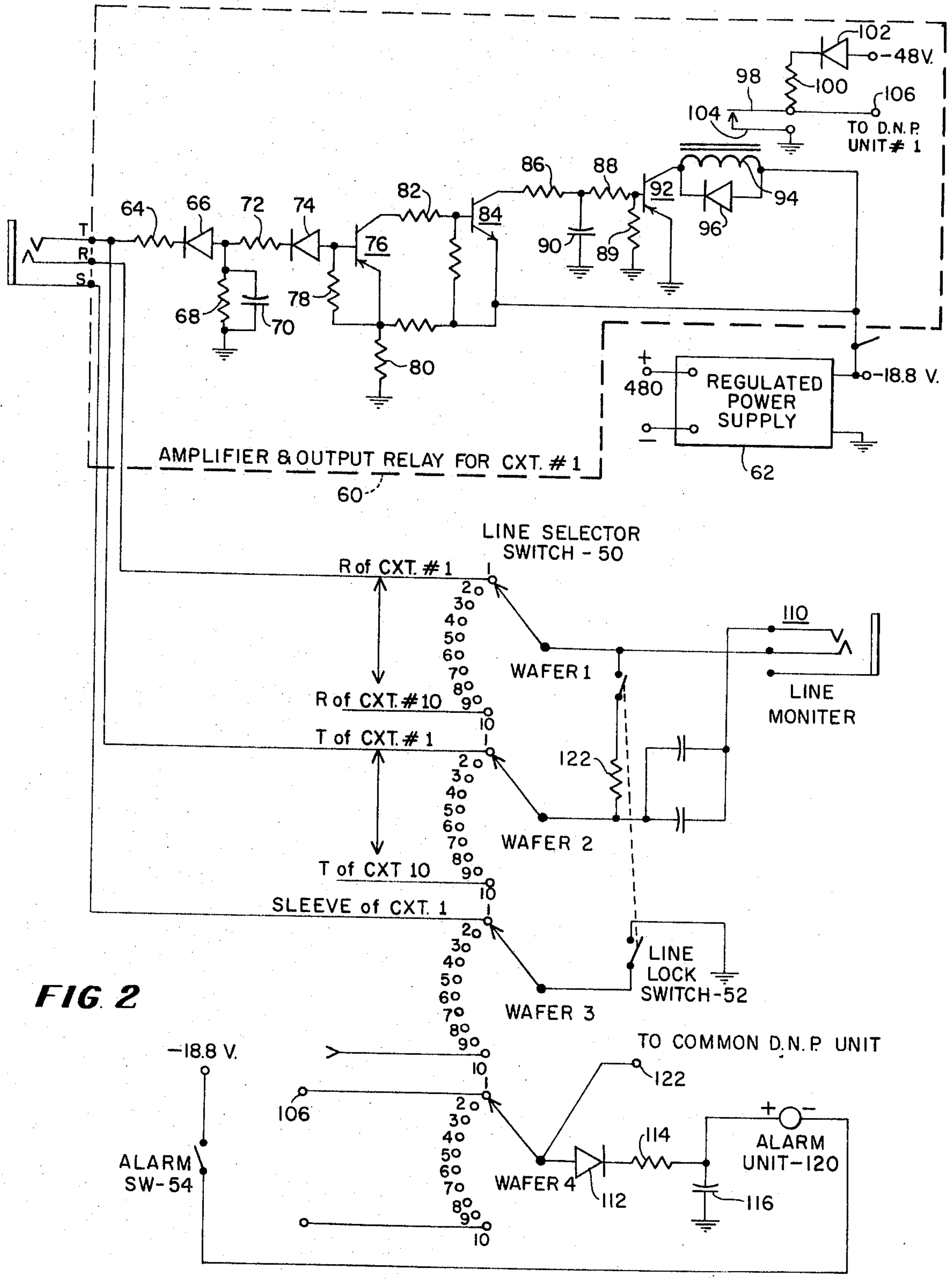
FIG. 2 is a schematic diagram of the service observation equipment of FIG. 1.

Referring now to FIG. 2, the circuitry of the service observation unit 20 is shown therein as comprising a series of 10 amplifier and output relay circuits, one of which is indicated generally at 60 in FIG. 2. Preferably each of the circuits 60 is in the form of a printed circuit board arrangement which is energized from a common regulated power supply 62 having a regulated output voltage of approximately minus 18 volts and energized from the 48 volt battery supply of the associated telephone equipment. More particularly, the tip conductor of the line which is to be observed, is connected through a series resistor 64, a diode 66 and a resistor 68 to ground so that a high impedance input circuit is provided for each line being observed so that normal transmission will not be degraded. A capacitor 70 is connected across the resistor 68 and a further series resistor 72 and diode 74 are employed to supply the signal developed across the elements 68, 70 to the base of a transistor 76. The base of the transistor 76 is connected through a resistor 78 to the emitter thereof which is also connected to ground through a resistor 80. The collector of the transistor 76 is connected through a load resistor 82 directly to the base of a second transistor 84 the emitter of which is directly connected to the minus 18 volt supply 62. The collector of the transistor 82 is connected to a filter network comprising the series resistors 86 and 88 and a shunt condenser 90 to the base of an output transistor 92 the emitter of which is connected to ground and the collector of which is connected through a relay winding 94 to the minus 18 volt supply. The base of the transistor 92 is connected to ground through a resistor 89. A protective diode 96 is connected across the relay winding 94 so as to prevent damage to this winding upon collapse of current therein. The movable contact 98 of the output relay is connected through a resistor 100 and diode 102 to the minus 48 volt supply and the fixed contact 104 of the output relay is connected to ground. When the output relay is operated a ground is supplied to the output terminal 106 and is transmitted to the corresponding one of the dialed number printout units 40 in one of the cabinets 34 or 36 according to the particular line with which the board 60 is associated.

Considering now the operation of the amplifier and output relay circuit 60, when the calling party comes off hook the tip conductor of his line goes negative with respect to ground and the resulting negative potential is applied to the base of the transistor 76 so as to turn this transistor on. Current flow through the collector resistor 82 likewise has the effect of turning on the transistor 84 and conduction of the transistor 84 provides a negative potential at the base of the output transistor 92 which is effective to render this transistor conductive and cause the output relay to operate so that the contacts 98, 104, thereof, are closed and a ground is applied to the output terminal 106.

It will be noted that when the calling party comes off hook and the transistor 76 is rendered conductive, a relatively high impedance is still maintained between tip and ground so that normal transmission is not degraded. Preferably, the series resistor 64 has a value of approximately 27,000 ohms to maintain a high input impedance for each of the circuits 60 during signal transmission and dialing. The diode 66 and resistance-capacitance network 68–70 are employed to provide a predetermined delay and some pulse shaping so that the transistor 76 accurately follows the off hook and dial impulses of the calling party.

Considering now the line surveillance and line lock out facilities of the service observation unit of FIG. 2, the tip conductors of each of the 10 lines being monitored are supplied to the corresponding contacts of wafer No. 2 of the four wafer line selector switch 50. In a similar manner, the ring conductors of each of these 10 lines is supplied to wafer No. 1 of the switch 50 and the sleeve conductor of each of these lines is supplied to the appropriate contacts of wafer No. 3 of the switch 50. The output ground produced at the output terminal 106 of each of the units 60 in the manner described above is also arranged to be supplied to the corresponding contacts of wafer No. 4 of the switch 60 for alarm monitoring purposes. The head set 56 is arranged to be connected to a jack 110 so that any one of the 10 lines may be monitored by adjusting the switch 50 to a position corresponding to that line in which case the tip and ring conductors of a selected line are supplied to the jack 110.

With regard to the alarm facilities provided in the unit 20, an alarm switch 54 is employed to supply minus 18 volts to one side of an alarm unit 120, the other side of which is arranged to receive ground from one of the terminals 106 through a diode 112 and a resistor 114, a shunt capacitor 116 being employed for smoothing purposes so that the alarm unit 120 responds only to a continued off-hook condition on the calling line. The line lock switch 52 is employed to ground the sleeve lead of the selected line on wafer No. 3 of the switch 50 and is also arranged to connect a 1,000 ohm resistor 122 between the tip and ring conductors of the selected line.

Considering now the operation of the line lock out and serveillance facilities, when the alarm switch 54 is closed, the attendant may select a particular one of the 10 lines for continuous surveillance by adjusting the switch 50 to a position corresponding to that line. When a call is initiated on the selected line, a ground potential is supplied through the diode 112 and the resistor 114 to the other side of the alarm unit 120 so that this unit is energized and an audible alarm is sounded. The attendant is then informed that a call is being initiated on the particular line which he has selected for surveillance. The attendant may monitor the selected line by connecting his head set to the jack 110, either before or after dialing has been completed. Immediately following completion of the dialed number, a printed record is available on the tape of the dialed number printout unit 40 associated with the selected line, as will be described in more detail hereinafter in connection with a representative one of the units 40. If the attendant sees that the called number is not a proper one, either for security reasons or for other purposes, he can close the line lock out switch 52 which places a ground on the sleeve lead of the selected line so as to prevent the connection from being broken if the calling party tries to hang up. In addition, the resistor 122 is placed between tip and ring conductors of the selected line so as to maintain the battery feed relay connected with the selected line in an operative condition even though the calling party goes back off hook. The purpose of additionally grounding the sleeve lead of the selected line is because in some situations where resistance loop limits are less than 1,000 ohms, the resistor 122 may not provide sufficient current to hold up the line. Once the selected line is locked out by closing the switch 52, the selected line remains permanently out of service and the call may be traced to its origin in any suitable manner. The line lock out switch 52 is then opened before proceeding with another monitoring operation.

In the event that a single dialed number printout unit 40 is to be employed with a number of lines which may be selectively monitored by the unit 20, the information available at the movable contact of wafer No. 4 of the line selector switch 50 is employed as a source of supervisory information which is supplied to an output terminal 122. When this arrangement is used, the output terminals 106 of the 10 lines are not supplied to individual dialed number printout units but instead are merely supplied to the contacts of wafer No. 4 of the switch 50 so that any one of the ten lines may be selectively connected to the common dialed number printout unit.

Referring now to FIGS. 3A, 3B, 4 and 5, wherein the circuitry and front panel layout of one of the dialed number printout units 40 are shown in detail, each of these units is arranged to be energized either directly from the minus 48 volt supply when associated with a central office or, by a separate 48 volt power supply when operated on a subscriber's premises. To this end, the minus 48 volt power terminal 130 is supplied through a fuse 132, a polarity reversal protective diode 134 and a power switch 136 to all of the control relays in the control circuits of the dialed number printout unit and also to a printer shown in block diagram form in FIG. 3A at 138, the other terminal of the input power supply being connected to the ground terminal 140. The printer 138 comprises a series of print wheels each of which is of the solenoid-operated ratchet-actuated type and is separately responsive to dial impulses applied to one of the input terminals 1 to 14, inclusive. In addition to the 14 print wheels which are arranged to record different digits of a dialed number, the printer 138 is also provided with a series of print wheels suitable for recording the day, hour and minutes at which a record of the called number is made. To this end, a suitable timer, driven by the motor 142 is arranged to close the contacts 143 once every minute so that a set of interconnected print wheels, which are arranged to provide a designation of the day of the month (two wheels), AM or PM (one wheel), hours (one wheel) and minutes (two wheels) as shown in the representative record illustrated in FIG. 4, are continuously updated by moving the units minutes wheel one step each time the contacts 143 are closed, as will be readily understood by those skilled in the art. Since the dialed number printout unit is portable and may be set up for operation at many different times and places, time correction switches including the push button hour switch 144, the push button minutes switch 146 and the push button days switch 148 are preferably accessible from the front panel of unit 40 (FIG. 5) so that the printed record may be manually set initially to a desired time. While any suitable type of printer capable of performing the hereinafter described functions may be employed as the printer 38, this printer may be of the type manufactured by Practical Automation Inc., of Shelton, Connecticut as Moduprinter Model C4–190.

As discussed generally heretofore, the dialed number printout unit 40 is arranged to operate with either the service observation unit 20 or directly from the E or M lead of a two-way trunk, or ground or battery derived from the central office, or on the subscriber's premises by connection in series with the tip and ring connections to the subscriber's line circuit. Considering first the operation of the unit 40 when it is connected to the service observation unit 20, the control relay output appearing at the terminal 106 of the unit 20 is connected to the main input terminal 150 of the unit 40 so that when the contacts 98, 104 of the control relay in the corresponding circuit 60 are closed, ground is applied to one side of the operate coil of an A relay 152 the other side of which is connected to the movable contact of a signal input selector switch 154.

The selector switch 154 has six positions, in positions 1, 3,5 and 6 of which the movable contact is connected to minus 48 volts. In positions 2 and 4 of the switch 154 this movable contact is connected to ground. The signal input selector switch 154 is in position 5 when the dialed number printout unit 40 is receiving signals from the associated channel of the service observation unit 20 so that minus 48 volts is applied to the right hand side of the operate coil of the A relay 152 so that this relay is operated in response to the application of ground to the terminal 150.

The dialed number printout unit 40 employs a rotary stepping switch indicated generally at 156 for the control and dialed impulse distribution functions of the unit 40, the switch 156 being of the indirect operating type and having 26 positions in each of five levels identified individually as the A, B, C, D and E levels. The normally open contacts 158 of the A relay 152 are connected to one side of the operate coil of a B relay 160 the other side of which is connected to minus 48 volts, and a slow release circuit comprising the resistor 162 and capacitor 164 are connected in series across the operate coil of the relay 160. The normally open contacts 166 of the A relay 152 are connected to one side of the operate coil of an end of dial timing or ED relay 168 the other side of which is connected to minus 48 volts, a slow release circuit comprising the resistors 170 and 172 being connected across the operate coil of the relay 168. The normally closed contacts 174 of the ED relay 168 are connected in series with the normally open A contacts 158 to the position 15 contact on the B level of the stepping switch 156, the wiper contact on this level being connected to ground. The A relay contacts 166 are connected to the position 16 contact on the B level of the switch 156. The normally open contacts 176 of the B relay 160 are connected to one side of the operate coil of a C relay 178 the other side of which is connected to minus 48 volts, a slow release circuit comprising the resistors 180 and 182 being connected across the operate coil of the relay 178.

When the call is initiated and ground is placed on the terminal 150, the A relay 152, the B relay 160, the C relay 178, and the rotary switch 156 cooperate to distribute dial impulses of the different digits of the called number to different print wheels of the printer 138, the C relay 178 functioning as an interdigit changeover relay. More particularly, when the A relay 152 is operated, ground is supplied from the wiper contact on the B level of the switch 156 through the normally closed contacts 174 of the ED relay 168 and the normally open contacts 158 of the A relay 152 to the B relay 160 so that this relay is operated. Furthermore, due to the slow release circuit 162, 164, the B relay 160 remains up while the A relay 152 is dropping out during dial impulses. When the first digit is dialed, the C relay 178 is energized through the normally open contacts 176 of the B relay 160 and the normally closed contacts 184 of the A relay 152 which places ground on the left hand side of the operate coil of the C relay 178. When the C relay 178 is first operated, the normally open contacts 186 thereof are closed so that ground is applied to one side of the motor magnet coil 188 of the stepping switch 156, the other end of which is connected to minus 48 volts so that the stepping switch 156 is prepared for movement to the next position on the bank when the motor magnet coil 188 is deenergized, as will be readily understood by those skilled in the art.

In the D level of the stepping switch 156, the wiper contact is connected through the normally open contacts 190 of the B relay 160 and through the normally closed contacts 192 of the A relay 152 to ground. Accordingly, with the stepping switch 156 on position 2, as shown in FIGS. 3A and 3B, the first digit of dial impulses arising when the A relay 152 is operated in response thereto, is transmitted by way of the conductor 194 to the first or left hand printing wheel of the printer 138. Each of the print wheels in the printer 138 may comprise an arrangement as shown in FIG. 6 wherein a solenoid 193 is energized each time a ground is applied to the input 195 so that the print wheel 197 is ratchet-actuated in a series of steps to a desired position, as will be readily understood by those skilled in the art. Thus, if the first digit comprises three dial impulses, the A relay contacts 192 will be closed three times so that three ground impulses are applied over the conductor 194 to the solenoid 193 of the left hand print wheel 197 in the printer 138 so that this print wheel is stepped three steps and the numeral 3 on the periphery thereof is placed in printing position relative to the tape 44.

At the end of the first digit of dial impulses, the C relay 178 drops out because the normally closed contacts 184 of the A relay 153 remain open, and when the contacts 186 of the C relay 178 are opened, the motor magnet 188 is de-energized and the stepping switch 156 is spring actuated to position 3 thereof in which the D level wiper arm of the switch 156 is connected to the next print wheel conductor 196. During dialing of the next digit of dial impulses, ground is successively placed on the lead 196 so that the second print wheel is actuated to a position corresponding to the second digit of the dialed number. At the end of this second digit, the C relay 178, which was operated at the start of the second digit, drops out and the contacts 186 thereof open the motor magnet circuit 188 so that the selector switch 156 is moved to position 4 in which position the third digit of the dialed number will be supplied to the third print wheel of the printer 138 over the conductor 198. In an entirely similar manner, the additional digits of the dialed number are employed to set the successive print wheels in the printer 138 until all digits of the called number have been registered by adjustment of these print wheels.

In accordance with an important feature of the invention, an arrangement is provided for controlling the printer 138 so that the dialed number is printed only if the dialed number comprises a predetermined number of digits. More particularly, a 15-position digit selector switch 200 is provided having two ganged sections S–1 and S–2. The movable arm of the switch section S–1 is connected to ground and the first 14 fixed contacts of this section are connected respectively to the contacts at positions 3 through 16 of level E of the stepping switch 156. The E level wiper arm is connected to one side of the operate coil of a match relay 202 the other side of which coil is connected to minus 48 volts. When the wiper arm on the E level of the stepping switch 156 is moved to a position corresponding to the setting of the digit selector switch 200, ground is applied through this wiper arm to the relay coil 202 so that the match relay is operated. Thus, assuming that the selector switch 200 is set for 10 digits, when the E level wiper arm is moved to position 12, ground from the movable contact of the switch section S–1 is supplied through the E level wiper arm to the operate coil of the match relay 202 so that this relay is operated. In this connection it is pointed out that the E level wiper arm is normally homed to position 2 of the stepping switch 156 and is stepped to position 3 at the end of the first digit.

When ground is thus applied to the E level wiper arm, this ground is also supplied through a diode 204, the normally open contacts 206 of the B relay 160, and the normally closed contacts 208 of the C relay 178 to one energizing terminal 210 of an adjustable timer 212 the other energizing terminal 214 of the timer 212 being connected to minus 48 volts. The timer 212 may be of any suitable design and introduces, when energized, a time delay which is variable from 0 to 30 seconds and is normally set for a time delay of 15 to 20 seconds after ground is applied to the energizing terminal 210 thereof. Accordingly, if no further digits are dialed after the 10th digit, and the digit selector switch 200 is set to select a 10 digit dialed number, the timing interval of the timer 212 is initiated when the match relay 202 is operated and at the end of this time interval the normally open contacts 216 of the timer 212 are closed so that ground is applied through the normally open contacts 218 of the match relay 202 to the operate coil of this relay so that the relay 202 remains locked up after the end of the timing interval established by the timer 212.

When a match between the number of dialed digits and the setting of the digit selector switch 200 is achieved and the match relay 202 is operated in the manner described above, ground is also supplied through the diode 204 and the normally open contacts 206 of the B relay 160 to one side of the operate coil of a print relay 220 the other side of which coil is connected to minus 48 volts, a slow release circuit comprising the series resistor 222 and capacitor 224 being connected across the operate coil of the print relay 220, so that the relay 220 is operated.

When the print relay 220 is operated, a holding circuit for this relay is established from the grounded wiper contact on the C level of the switch 156 through the interconnected contacts at positions 2 to 15 on the C level, through the normally open contacts 226 of the match relay 202, through the normally open contacts 228 of the print relay 220 and through a diode 230 to the operate coil of the print relay 220 so that this relay will remain operated until the C level wiper arm is moved to position 16 at which time ground from the wiper contact on the C level is removed from this holding circuit.

Assuming that the match relay 202 remains operated after the desired 10 digit number has been dialed and the timer 212 times out, the normally open contacts 232 of the timer 212 are closed at the end of this timing interval so that ground from the C level wiper contact is applied through the C level wiper arm, the contacts 232 and the normally closed self-interrupt contacts 234 associated with the motor magnet 188, so that the stepping switch 156 self interrupts and steps from one position to the next until the C level wiper arm is moved to position 16 at which position ground is removed from the above traced circuit to the self interrupt contacts 234 and the stepping switch 156 stops on position 16.

When the B level wiper arm is moved to position 16 ground is applied from the wiper contact on the B level through the contacts 166 of the A relay 152 to the ED relay 168 so that this relay is operated. When the relay 168 is operated the normally open contacts 236 thereof are closed so that ground is applied through the normally open contacts 238 of the A relay 152 and through the contacts 236 to the operate coil of the relay 168 so that this relay is locked up.

When the end of dial timing relay 168 is operated, the normally closed contacts 174 thereof are opened so that the B relay is de-energized and the contacts 206 of this relay are opened. When the contacts 206 are opened ground derived from the switch section S–1 of the selector switch 200 is removed from the operate coil of the print relay 220. Also, when the C level wiper arm is moved to position 16 ground previously derived from the grounded C level wiper contact is removed from the holding circuit for the print relay 220. Accordingly, after the release interval determined by the resistor 220 and the capacitor 224 the print relay 220 is de-energized. However, as soon as the switch 156 is moved to position 16 ground derived from the grounded C level wiper contact is applied through the normally open contacts 240 of the print relay to one side of a print solenoid relay 242 the other side of which is connected to minus 48 volts so that the print solenoid relay 242 is operated. When this occurs the contacts 244 of the relay 242 are closed so as to energize a print solenoid within the printer 138 which solenoid requires the high current contacts 244 to operate it. When this print solenoid is energized, an imprint is made on the tape 44 in accordance with the setting of the 14 digit print wheels and the position of the day, hour and minute print wheels. This imprint may, for example, be made by a solenoid actuated printer bar which when depressed presses the paper tape 44 against an inked ribbon positioned between the paper tape and raised indicia on the print wheels, suitable facilities being provided for advancing the paper tape after each printout operation and advancing the ribbon to present fresh surfaces, as will be readily understood by those skilled in the art. When the print relay 220 is de-energized shortly after the switch 156 moves to position 16, the contacts 240 thereof are opened so that the print solenoid relay 242 is energized only for sufficient length of time to permit the printing operation to occur. Customarily, the contacts 240 of the print relay 220 are closed for a period of about 100 milliseconds to permit the printing operation to be completed.

When the switch 156 moves to position 16, the B relay 160 is de-energized in the manner described above, and after the printing interval, the P relay 220 is also de-energized. When both the P relay 220 and the B relay 160 are no longer operated, minus 48 volts is applied through the normally closed contacts 250 of the P relay 220 and through the normally closed contacts 252 of the B relay 160 to the reset terminal of a printer control circuit indicated generally at 254 so that minus 48 volts is applied through a differentiation circuit including a capacitor 255 and resistors 257 and 259 to the base of a control transistor 261. The transistor 261 conducts and applies ground to one side of the operate coil of a reset relay 256 the other side of which is connected to minus 48 volts. The printer control circuit 254 includes an oscillator circuit 263 of any suitable design which is arranged, when enabled, to develop pulses at a rate of about 40 pulses per second. When the reset relay 256 is operated and the normally closed contacts 258 thereof are opened, the oscillator 263 is enabled and supplies pulses through the normally open contacts 265 of the relay 256 and over the reset lead 260 to the reset inputs 262 (FIG. 6) of all of the digit print wheels in the printer 138. These pulses step the print wheels until a notch on each wheel is encountered at the home position of each wheel at which time the switches 264 are opened and the wheel actuating solenoid 193 is no longer responsive to these reset pulses. Preferably, these print wheels are reset to a home position at which they print a dot, as indicated in FIG. 4. The time constant of the above-described differentiation circuit in the printer control circuit 254 is such that the reset relay 256 remains energized for about 400 milliseconds, i.e., enough time for all of the print wheels to be reset to their home positions, after which the relay 256 drops out and no further pulses are supplied over the conductor 260.

After the stepping switch has moved to position 16 and the print relay 220 is de-energized at the end of the printing interval the normally closed contacts 270 of the print relay 220 are closed so that ground is applied through the A level wiper arm, the normally closed contacts 272 of the B relay 160 which is now de-energized, and the self-interrupt contacts 234 of the motor magnet so that the stepping switch 156 self interrupts to position 17. At position 17 the A level wiper arm again encounters ground which is connected to the contacts at positions 17, 18, 19, 21, 23 and 25, so that the self-interrupt action of the switch 156 continues until the A level wiper arm moves to position 20. Assuming that the instant readout switch 274 is in the off position, the A level contacts at positions 20, 22, 24 and 26 are also connected to ground through the contacts 275 of the switch 274, so that the stepping switch 156 self-interrupts to position 26 and then moves to position 1. Assuming that the digit absorb switch 276 is also in the off position, the A level wiper arm encounters ground at position 1 through the switch 276 and self-interrupts one further step to the position 2 at which position the switch 156 is ready to receive dial impulses during the next call. The call proceeds until terminated when the A relay 152 drops out. However, when the B relay 160 drops out at the end of the timing interval the contacts 190 thereof are opened so that the calling party cannot introduce spurious impulses into the digit print wheels by moving his dial as the call proceeds.

In accordance with a further feature of the invention, facilities are provided for printing out the time at which the call is terminated so that the holding time for that call can be determined by subtracting the two times printed on the tape 44. More particularly, a holding time switch 280 is provided which when placed in the ON position is effective to cause the time at which the call is ended to be printed. Thus, when the call is ended, the normally closed contacts 282 of the A relay 152 are closed so that ground is supplied through the normally open contacts 284 of the ED relay 168, the holding time switch 280 and the contacts 282 to one side of the operate coil of a holding time relay 286 the other side of which is connected to minus 48 volts, a release delay circuit comprising the series resistor 288 and the capacitor 290 being connected across the operate coil of the relay 286. In this connection, it should be noted that the end of dial timing relay 168 remains operated for the release period determined by the elements 170, 172 after the call is terminated and the A relay 152 drops out. Accordingly, the contacts 284 of the ED relay 168 remain closed for a sufficient interval to permit the holding time relay 286 to be energized when the contacts 288 of the A relay 152 are closed.

When the holding time relay 286 is operated, its normally open contacts 292 are closed. Furthermore, due to the slow release elements 288, 290, the holding time relay 286 remains operated after the ED relay 168 drops out and the normally closed contacts 294 of the ED relay 168 are closed so that ground is supplied through the normally closed contacts 294 of the relay 168 and the normally open contacts 292 of the holding time relay 286 to the print solenoid 242. This results in a printing operation in the manner described above wherein all of the digit print wheels are set to print a series of 14 dots, as shown at 296 in FIG. 4, together with the time at which the call is terminated, this time being indicated in FIG. 4 as the 15th day of the month, at 9:42 AM. The holding time of the call may then be determined by subtracting from the time at which the call was terminated the time at which this call originated which appears in line 298 of FIG. 4 as the time 9:31. After a short interval sufficient for accomplishing the printing operation in the printer 138, the holding time relay 286 also drops out so that the contacts 292 thereof are opened and the print solenoid 242 is no longer energized.

As stated above, the rotary switch 156 normally homes to position 2 when the digit absorb switch 276 is in the off position. Under certain conditions, when the calling party comes off hook and before the calling party receives dial tone, a false pulse may be produced in the preceding telephone equipment, due to a coin check, two-party check, or the like, which is of sufficient duration to cause the A relay 160 to drop out. Thus, for example, a false pulse of approximately 80 milliseconds duration may be sufficient to cause the A relay 160 to drop out.

In order to prevent such a false pulse from being registered in the printer 138 as the first digit of the called number, the digit absorb switch 276 is provided which when thrown to the ON position places a ground upon the position 2 contact in the A level in the switch 156 rather than on position 1. Accordingly, when the rotary switch 156 homes to position 1 the A level wiper arm does not see ground at this position and hence the switch is stopped on position 1, since it cannot move by self-interruption to position 2 as described heretofore in connection with the non-digit-absorbing operation. When the false pulse is received, the D level wiper arm is at position 1 which is empty in the D level so that no pulse is sent to any of the digit print wheels in the printer 138. However, this false pulse causes the C relay 178 to operate so that the contacts 186 thereof are closed and the motor magnet is cocked. When the C relay 178 drops out after this false pulse, the switch 156 is then moved to position 2 in the manner described above in connection with interdigit movement of the switch 156. With the wiper arm at the D level now in position 2, the next digit of dial impulses is transmitted over the lead 194 to the first print wheel in the printer 138 in the manner described in detail heretofore.

In the printer 138 the tape 44 is automatically advanced one space at the end of each printing operation, i.e., each time the print solenoid relay 242 is operated. However, the point at which the digit and time information is printed in the printer 138 is several spaces removed from the window 42 where the printed information is visible to an attendant. In accordance with a further feature of the invention, instant readout facilities are provided so that after each printing operation the tape 44 is advanced a number of spaces sufficient to advance the information just printed so that it can be viewed through the window 42. In the illustrated embodiment, the paper tape 44 is advanced four spaces after each printing operation when the instant readout switch 274 is thrown to the ON position. In this position of the switch 274 the A level contacts 20, 22, 24 and 26 are no longer grounded through the contacts 275 of the switch 274 but the B level contacts at positions 20, 22, 24 and 26 are connected through the contacts 277 of the instant readout switch 274 and the normally closed contacts 300 of a paper advance relay 302 to one side of the operate coil of the C relay 178. In the C level of the rotary switch 156, the contacts at positions 20, 22, 24 and 26 are connected through the normally open contacts 304 of the C relay 178 to one side of the operate coil of the paper advance relay 302, the other side of this coil being connected to minus 48 volts. A slow release circuit comprising a resistor 306 and a capacitor 308 are connected across the paper advance relay coil 302.

Assume that a printing operation has been completed and the rotary switch 156 has moved off of position 16 and moves to position 20. When this occurs, ground is supplied from the B level wiper arm, through the contacts 277 of the instant readout switch 274 and the normally closed contacts 300 of the paper advance relay 302 to the C relay 178 so that this relay is operated. When the C relay is operated, the normally open contacts 304 thereof are closed, so that ground is supplied from the C level wiper arm through the contacts 304 to the paper advance relay 302 so that this relay is also operated. When both the C relay 178 and the paper advance relay 302 are operated, ground is supplied through the normally open contacts 310 of the end of dial timing relay 168, the normally open contacts 312 of the paper advance relay 302 and the normally open contacts 314 of the C relay 178 to one side of a paper advance solenoid relay 316, the other side of which is connected to minus 48 volts, so that this solenoid is actuated. When this occurs, the normally open contacts 318 of the paper advance solenoid relay 316 are closed and a paper advance solenoid in the printer 138 is energized, this paper advance solenoid being controlled by closure of the high current contacts 318. When this paper advance solenoid is energized, the paper 44 is advanced one space independently of the printing mechanism in the printer 138, this paper advance being accomplished by any suitable mechanism within the printer 138, as will be readily understood by those skilled in the art. However, as soon as the paper advance relay 302 is operated, the normally closed contacts 300 thereof are opened so that the C relay 178 drops out after its release period determined by the elements 180, 182. Accordingly, the paper advance solenoid relay 316 is energized only for the duration of closure of the C relay contacts 314 which is made sufficiently long to permit the paper advance mechanism to operate.

At the same time that the paper advance solenoid relay 316 is operated by closure of the C relay 178 and the paper advance relay 302, closure of the contacts 186 of the C relay 178 causes the rotary switch 156 to cock so that when the C relay 178 drops out the switch 156 advances to position 21. In position 21, the A level wiper arm is grounded and supplies ground through the normally closed contacts 272 of the B relay 160 and the motor magnet interrupt contacts 234 to the motor magnet 188 so that the switch 156 self-interrupts to position 22. The paper advance relay 302 drops out a release interval after the C relay contacts 304 are opened, so that the rotary switch is now on position 22 with both the C relay 178 and the paper advance relay 302 dropped out. A similar paper advance operation then ensues at each of the positions 22, 24 and 26 of the rotary switch 156 so that the paper tape 44 is advanced four spaces after each printing operation when the instant readout switch 274 is in the ON position shown in FIG. 3B.

As discussed generally heretofore, the digit selection facilities in the unit 40 are such that if the dialed number has less digits or more digits than the number of digits set on the switch 200 no printing operation is performed and the call is rejected insofar as dial number printout is concerned. Thus, assuming that the switch 200 is set to accept a 10 digit number and the calling party dials only seven digits, i.e., a local call rather than a long distance call, the rotary switch 156 will be positioned at position 9 after the seventh digit is dialed. At this point, the E level wiper arm does not see ground on the switch section S–1 and the match relay 202 is not operated. Accordingly, even though the contacts 206 and 208 are closed, following dialing of the last digit, no ground is placed on the terminal 210 of the timer 212 so that this timer does not initiate a timing interval. Furthermore, no ground is available through the contacts 206 to operate the print relay 220. Since no timing interval is initiated the contacts 232 of the timer 212 are not closed, so that the rotary switch 156 remains at position 9 corresponding to a seven-digit number until the end of the call. When the call is terminated, the A relay 152 drops out and after its release interval the B relay 160 drops out. When the B relay drops out, its contacts 272 are closed, so that ground is applied from the position 25 contact on the A level of the switch 156 back through the A level wiper arm, the contacts 272 and the motor magnet self-interrupt contacts 234 to the motor magnet 188 so that the switch 156 self interrupts to the home position, i.e., either positions 1 or 2 of this switch depending upon the position of the digit absorb switch 276. During this homing operation the paper may be advanced four spaces or not, depending upon the position of the instant readout switch 276, as described in detail heretofore.

Considering now the situation where a larger number of digits is dialed by the calling party than the number set on the selector switch 200, and assuming that this switch is set for a 10 digit number, when the 10th digit is dialed ground is applied to the match relay 202 through the switch section S–1 so that the match relay 202 is operated and this ground is also supplied through the diode 204, the B relay contacts 206 and the C relay contacts 208 to the energizing terminal 210 of the timer 212 so as to start a timing interval. However, as soon as the calling party dials an 11th digit, and the switch 156 is moved to position 13 at the end of this 11th digit, ground is removed from the match relay 202 before the end of the timing interval so that the match relay 202 drops out since ground is no longer applied through the switch section S–1. Furthermore, ground is no longer applied to the input terminal 210 of the timer 212 so that this timer is reset to zero and does not initiate another timing interval.

When the match relay 202 is operated upon dialing of the 10th digit, the print relay 220 is also operated in the manner described heretofore. However, when the 11th digit is dialed, and ground is removed from the match relay 202, the contacts 226 of the match relay 202 are opened so that ground is removed from the holding circuit of the print relay 220 through the grounded C level wiper arm, so that the print relay 220 is also de-energized when the 11th digit is dialed. AS successive further digits are dialed by the calling party, the switch 156 is moved to successive positions but since the timer 212 is never thereafter energized no timing interval is completed, and the print relay 220 remains de-energized. If less than 14 digits are dialed by the calling party, the switch 156 remains at the position of the last digit dialed until the end of the call at which time the B relay 160 drops out and the contacts 272 thereof are closed so that the switch 156 moves to the home position as described in detail heretofore.

Under certain conditions it may be desirable to print all of the numbers dialed irrespective of the number of digits in these dialed numbers. When this type of operation is desired, the selector switch 200 is moved to the 15th, or ALL position in which ground is continuously supplied to the contacts 208 of the B relay 160 through the switch section S–1. Accordingly, ground is applied to the energizing input terminal 210 of the timer 212 at the end of the first digit when the contacts 208 of the C relay 178 are closed. A timing interval is thus initiated by the timer 212 at the end of the first digit upon closure of the contacts 208. When the contacts 208 are opened at the start of the second digit the timer 212 is reset to zero. However, another timing interval is started when the contacts 208 are again closed at the end of the second and all succeeding digits. The diode 204 prevents the ground which is applied to the contacts 206 from also being applied to the match relay 202 so that this relay is not operated during any dialing operation when the digit selector switch is in the ALL position. However, ground is applied through the contacts 206 to the print relay 220 so that this print relay is operated as soon as the B relay 160 is energized. When the P relay is operated a holding circuit is closed through the contacts 228, the switch section S–2 of the digit selector switch 200, and the C level wiper arm. The switch contacts of the section S–2 take the place of the match relay contacts 226 which remains de-energized in the ALL digit print position of the switch 200.

After all digits of the dialed number have been dialed, and irrespective of the number of digits in the dialed number, the timer 212 remains energized by virtue of the ground applied to the terminal 210 thereof so that a timing interval is permitted to be completed at which time the contacts 232 of the timer 212 are closed. When this occurs, ground from the C level wiper arm is applied back through the contacts 232 and the contacts 234 to the motor magnet 188 so that the switch 156 moves by self-interruption to position 16. When the C level wiper arm of the switch 156 moves to position 16, ground is removed from the above-described holding circuit and after the release interval of the print relay 220 this relay drops out. However, the print relay contacts 240 remain closed for a sufficient time interval after the switch 156 moves to position 16 to the provide proper actuation of the print solenoid relay 242 so that the dialed number, together with time and date information, is printed in the manner described in detail heretofore. When the print relay 220 is de-energized the contacts 270 thereof are closed so that the switch 156 self-interrupts to the home position in the manner described in detail heretofore.

While the printing operation normally does not occur until the end of the timing interval established by the timer 212 after the last digit is dialed, it is pointed out that if the calling party hangs up immediately after dialing a printing operation is automatically performed independently of the timer 212. Thus, when the calling party hangs up and the B relay falls down after its slow release interval, the contacts 272 of the B relay 160 are closed and the switch 156 moves to position 16 in the manner described heretofore. However, the print relay remains up until the switch 156 moves from position 15 to position 16 at which time the above-described holding circuit for the print relay 200 is broken. The print relay 220 thus remains operated when the switch 156 moves to position 16 and since the contacts 240 thereof are closed a printing operation takes place in the manner described in detail heretofore. As soon as the print relay 220 drops out, the contacts 270 thereof are closed and the switch 156 moves to its home position and is ready for another call.

As discussed generally heretofore, the dialed number printout unit 40 is arranged to accept input signals from various types of telephone equipment. For example, when the signal input selector switch 154 is in position 1, the supervisory signalling E lead of a trunk circuit may be connected to the input terminal 150. In position 1 of the switch 154 minus 48 volts is applied to one side of the operate coil of the A relay 152 so that when ground is placed on the input terminal 150, this relay is operated. Also, in position 2 of the switch 154 the M lead signals of a trunk circuit may be accepted since in this position of the switch 154 ground is placed on the relay 152 through the switch 154. In position 3 of the switch 154 other types of ground signals can be applied to the terminal 150 and in the position 4 of the switch 154 other types of negative or battery switching signals can be applied to the terminal 150. In all such instances, the unit 40 functions in the manner described in detail heretofore to provide immediate printout of the dialed number together with the above-described facilities for digit selection and digit absorption.

In the event that the dialed number printout unit 40 is to be used at the subscriber's premises, a separate series input circuit arrangement is employed and the signal input selector switch 154 is thrown to position 6. In this position, minus 48 volts is applied to one side of the operate coil of the A relay 152. The tip conductor from the central office is connected to one side of the operate coil of an L relay 330 the other side of which is connected to the tip terminal 332 which is routed to the subscriber's line circuit. A resistor 334 is connected in parallel with the operate coil of the relay 330 as is a condenser 336. The ring conductor from the central office is merely routed back out to the subscriber's line circuit. Accordingly, when the signal input selector switch 154 is in position 6, the unit 40 is able to operate with the above-described series connection and the line relay 330 is energized in accordance with off-hook and dial impulse conditions at the calling line. When the line relay 330 is operated, the normally open contacts 338 thereof are closed so that ground is applied to one side of the operate coil of the A relay 152. Since the other side of this coil is connected to minus 48 volts when switch 154 is in position 6, the A relay 152 is likewise operated and continues to engage and release in synchronism with the line relay 330.

By providing this series input arrangement which includes the line relay 330, the loop resistance may vary considerably with different line lengths and still provide adequate operation of the dialed number printout unit 40 since the line relay 330 is actuated in accordance with current flow over the series loop. Thus, the relay 330 will operate satisfactorily with currents from 22 to 150 milliamperes, the resistor 334 preferably having a value of 470 ohms when the operate coil of the relay 330 has a resistance of 41 ohms. The capacitor 336 functions to minimize transients arising in other portions of the system.

From the above description of the different possible types of operation of the unit 40, it will be evident that this unit may be used separately from the service observation unit 20 in situations where various types of input signals are to be accommodated and the dialed numbers printed out as described in detail heretofore. In such instances, the signal input selector switch 154 is moved to the correct position to accept the desired type of input signal and the unit 40 functions to provide the desired dialed number print record.

When the unit 40 is installed at a particular location, it is necessary to set the timer contained in the printer 138 to coincide with the time at which the printing operation is initiated. This may be conveniently done by employing a push button print switch 340 which connects one side of the print solenoid 242 to ground when it is depressed. With this arrangement, the day push button switch 148, the hour push button switch 144 and the minute push button switch 146 are set to the desired position. The print switch 340 is then depressed so that the day, hour and minute designations which have been set are printed on the tape 44. The print switch 340 may be depressed a number of times so as to bring the printed time and date into the window 42 so that the time setting may be quickly verified and corrected if necessary.

While there have been described what is at present considered to be the preferred embodiments of the invention, it will be understood that various modifications may be made therein which are within the true spirit and scope of the invention.

What is claimed as new and desired to be secured by Letters Patent of the United States is:

1. A dialed number printout unit, comprising means for connecting said unit to a telephone line, means responsive to the dialing of a called number by a calling party on said line for registering the digits of said called number, a record medium, means for advancing said record medium in a predetermined direction, means for printing the digits of said registered number in numerical form on said record medium in a line perpendicular to said predetermined direction and immediately following completion of dialing thereof by the calling party, and means for controlling said register means so that a print is made on said record medium only when the called number has a predetermined number of digits.

2. A dialed number printout unit as set forth in claim 1, which includes means for varying said predetermined number of digits.

3. A dialed number printout unit, comprising means for connecting said unit to a telephone line, means responsive to the dialing of a called number by a calling party on said line for registering the digits of said called number, a record medium, means for advancing said record medium in a predetermined direction, means for printing the digits of said registered number in numerical form on said record medium in a line perpendicular to said predetermined direction and immediately following completion of dialing thereof by the calling party, means for printing along said perpendicular line of said record medium the time at which said printed called number is printed, said register means including a series of print wheels corresponding to the digits of a called number and each having indicia indicating a home position, and means responsive to completion of said call for printing on said record medium and in a line perpendicular to said predetermined direction the time at which said call completion occurs together with said home position indicating indicia of said print wheels.

4. A dialed number printout unit, comprising means for connecting said unit to a telephone line, means responsive to the dialing of a called number by a calling party on said line for registering the digits of said called number, a record medium, means for advancing said record medium in a predetermined direction, means for printing the digits of said registered number in numerical form on said record medium in a line perpendicular to said predetermined direction and immediately following completion of dialing thereof by the calling party, means for normally printing said called number a predetermined fixed interval after dialing is completed by the calling party, and means for automatically printing said called number as soon as the calling party hangs up and independently of said fixed time interval.

5. A dialed number printout unit, comprising means for connecting said unit to a telephone line, means responsive to the dialing of a called number by a calling party on said line for registering the digits of said called number, a record medium, means for advancing said record medium in a predetermined direction, means for printing the digits of said registered number in numerical form on said record medium in a line perpendicular to said predetermined direction and immediately following completion of dialing thereof by the calling party, said register means including a series of print wheels corresponding to the digits of a called number and each having home position indicating indicia, means for resetting said print wheels to said home position as soon as said called number has been printed on said record medium, and means responsive to completion of said call for printing on said record medium and in a line perpendicular to said predetermined direction the time at which said call completion occurs together with said home position indicating indicia of said print wheels.

* * * * *